United States Patent [19]

Thompson

[11] Patent Number: 4,907,541
[45] Date of Patent: Mar. 13, 1990

[54] PET RESTRAINT

[76] Inventor: Paul L. Thompson, P.O. Box 146, Tijeras, N. Mex. 87059

[21] Appl. No.: 233,480

[22] Filed: Aug. 17, 1988

Related U.S. Application Data

[63] Continuation-in-part of Ser. No. 874,518, Jun. 16, 1986, abandoned.

[51] Int. Cl.⁴ .................. A01K 3/00; A01K 27/00
[52] U.S. Cl. .................................................. 119/96
[58] Field of Search ......................... 119/96, 106, 109

[56] References Cited

U.S. PATENT DOCUMENTS

| | | | |
|---|---|---|---|
| 2,826,172 | 3/1958 | Buckle et al. | 119/109 |
| 3,310,034 | 3/1967 | Dishart | 119/106 |
| 3,948,222 | 4/1976 | Longshore et al. | 119/96 |
| 4,597,359 | 7/1986 | Moorman | 119/96 X |

FOREIGN PATENT DOCUMENTS 65509  11/1982  European Pat. Off. .............. 119/96

Primary Examiner—Robert P. Swiatek
Assistant Examiner—R. Thomas Price
Attorney, Agent, or Firm—Harpman & Harpman

[57] ABSTRACT

An easily transportable pet restraint which is adapted to keep a pet within certain bounds in a vehicle and which will serve to prevent injury to the pet in the event of a vehicle accident. The restraint is a harness having an adjustable flexible belly band, a flexible chest band joined to the belly band, a flexible collar joined to the chest band, a member connecting the belly band and the collar at a clasp secured to the member to join with the existing seat belts in a vehicle.

3 Claims, 2 Drawing Sheets

/A0,907,541

PET RESTRAINT

This is a continuation in part of U.S. patent application Ser. No. 06/874,518, filed June 16, 1986, and now abandoned.

BACKGROUND OF THE INVENTION

1. Technical Field

This invention relates to pet restraints which are adapted to keep a pet, such as a dog or cat, restrained within a vehicle so as to prevent injury which is common during sudden stops when the pet is thrown forward in the vehicle. Devices such as this are also used to maintain the pet within an unattended vehicle by restricting the pet to a certain area in the vehicle without harm to either the pet or the vehicle.

2. Description of Prior Art

Prior Art devices of this type have relied on a variety of different structural configurations in an attempt to restrain the pet within a given area. See for example U.S. Pat. Nos. 4,597,359, 3,948,222, French Pat. No. 2,502,962 and U.S. Pat. No. 230,036. Also see World Almanac Book of Inventions published 1985 on a safety belt for dogs.

In U.S. Pat. No. 4,597,359 a platform and safety harness for restraining a pet is disclosed in which a platform having a supportive bracket is positioned on the vehicle of a seat. The platform itself is secured to the seat by the seat's safety belt with a secondary independent belt extending from the platform itself to engage with a harness on the pet characterized by a cross chest configuration with the point of attachment of the harness to a safety belt configuration on the belly band of the harness on the pet.

In U.S. Pat. No. 3,948,222 a animal safety harness is disclosed which utilizes a flexible chain element secured by an I-bolt into the floor of the vehicle which is engaged at two points on either side of the chest strap of a harness on the pet. This device utilizes the two points of attachment to the chest band of a harness with a chain extending therebetween from which is extended a attachment point which is engageable with the flexible element extending into the floor of the vehicle.

In French Pat. No. 2,502,926 a harness is disclosed having an upstanding swivel at the intersection points of the harness members on the back of the dog for engagement by a elongated flexible strap which can be secured into a vehicle by an achorage point.

In U.S. Pat. No. D. 230,036 a tail engaged dog control harness is disclosed which utilizes a harness configuration having a separate strap for engagement of the dog's tail from which extends a flexible member through an attachment point on the harness.

Finally, the World Almanac Book of Inventions discloses a safety belt for dogs invented in 1980 by an Australian firm which shows the use of a two-strapped harness configuration extending around the dog's chest and neck and under his torso behind his front legs with a chain attached to a safety seat belt in a vehicle engaging the neck or chest portion.

SUMMARY OF THE INVENTION

The safety pet restraint for vehicle is comprised of a harness having adjustable flexible bands to embrace the body of the pet and a clasp secured to the harness to join with existing seat belts in a vehicle. It will be understood that if the vehicle is a pleasure boat or a mobile home, it may not have seat belts installed therein, such belts can readily be installed by the owner to cooperate with the restraint of this invention to be described herein after.

The invention provides a simple restraining device for a pet which can act as both a restraint for the pet within the vehicle by attachment to a seat belt or alternately can be used as a lead or leash device so that the pet can be removed from the vehicle simply and easily and attached to a lead or leash for walking outside of the vehicle.

DESCRIPTION OF THE PREFERRED EMBODIMENT

Figure 1:
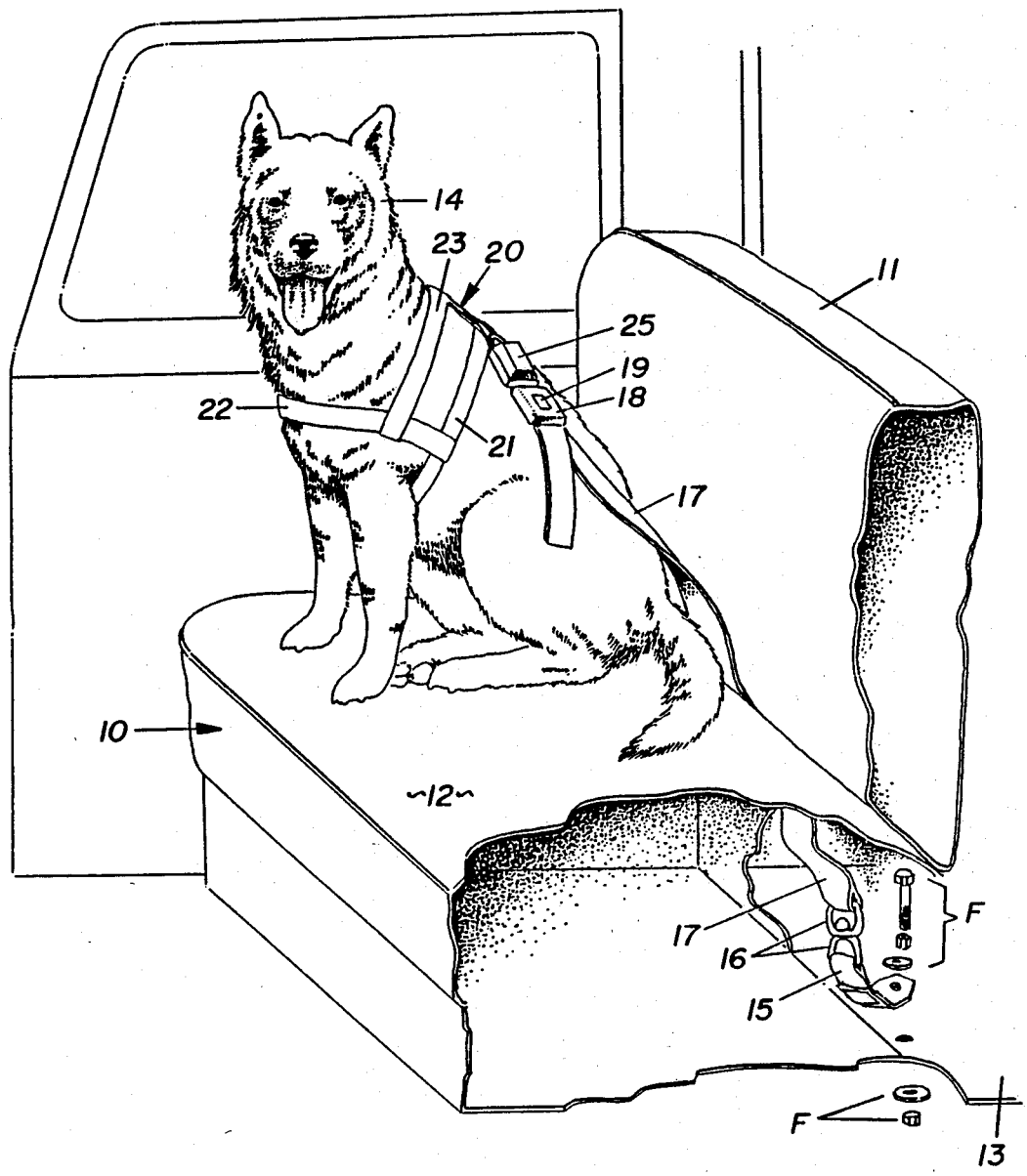
FIG. 1 is a perspective view of the device in operation on a pet in a vehicle with portions broken away for illustration.

Referring now to the drawings, there is shown in FIG. 1 an automobile seat 10 having a back portion 11 and a seat portion 12 is positioned inside a vehicle (not shown) on a floor 13. A pet 14 is positioned on the seat 10 and is seated in this illustration.

An achor strap 15 is secured to the floor 13 of the vehicle V by a fastener F as will be well understood by those skilled in the art. The anchor strap 15 has a swivel coupling 16 from which extends a seat belt strap 17 up between the seat portion 12 of the seat 10 and the back portion 11. The seat belt portion 17 has a clasp 18 positioned on one end with a release button 19 which is common in seat belt configurations found in vehicles today.

The clasp 18 is of a female type with the release button 19 adapted to receive and grip a flat male type blade when in use.

Figure 4:
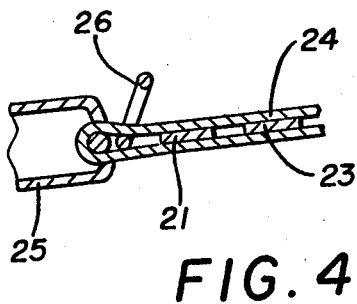
FIG. 4 is partial cross-section on lines 4—4 of FIG. 2 illustrating the relationship of the seat belt clasp with the harness.
Figure 2:
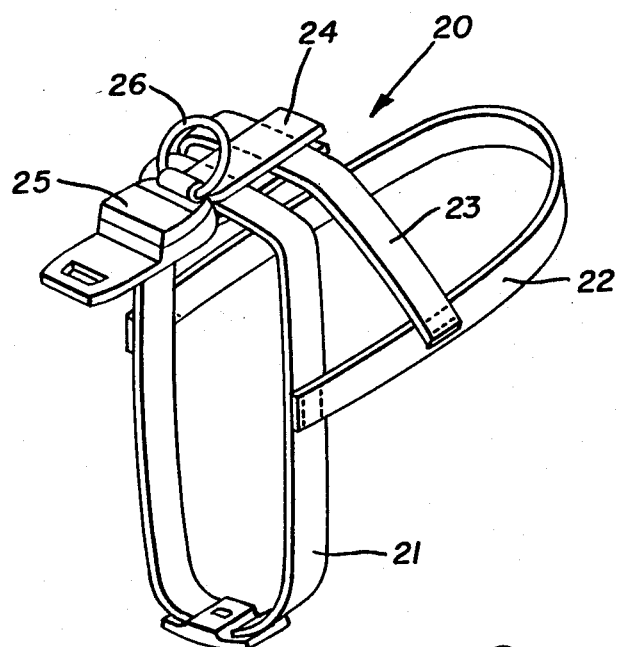
FIG. 2 is a perspective view of the harness portion of the device showing the utilization of a safety clasp engaged on the harness.

Referring now to FIGS. 1, 2 and 4 of the drawings a pet restraint harness 20 is shown comprising an adjustable belly band 21, a chest band 22 extending from said belly band at substantially right angles thereto. A collar band 23 bridges the chest band 22 in spaced relation to said belly band. The collar band 23 engages the chest band at an angular inclination as evident in FIG. 2 of the drawings.

A clasp joining member 24 is best seen in FIG. 2 of the drawings extends over and intersects at right angles both the collar band 23 and the upper portion of the belly band 21 forming a loop at one end and then is secured to the bottom surfaces of said collar and belly band. The clasp joining member 24 is engaged around a male seat belt blade 25 with the addition of a ring or attachment point 26 secured within.

In use the harness 20 is placed on the body of the pet 14 and securely fastened thereon so a comfortable fit is obtained and the pet is placed on the seat portion 12 of the vehicle seat 10. The seat belt member 17 is then secured via the clasp 18 to blade 25 on the harness anchoring same to the floor of the vehicle 13 as hereinbefore described.

Figure 3:
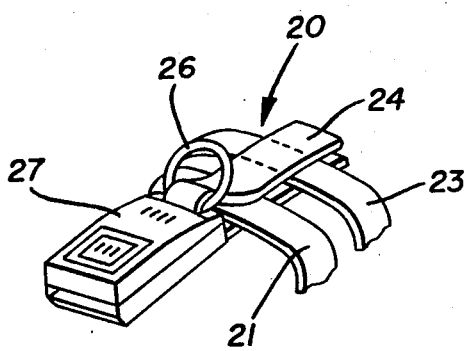
FIG. 3 is an alternate form of the invention showing a alternate clasp being attached to the harness.

In an alternate form of the invention shown in FIG. 3 of the drawings, the harness 20 with its related clasp joining member 24 is arranged to accept a female type clasp 27 in place of the male blade 25 so that the alternate form of the harness assembly can be used with the other portion of the seat belt not shown which is typically found in a vehicle thereby allowing more latitude of use and comfort for the users and the pet.

It will be evident from the above description that the pet when wearing the harness 20 will be securely positioned within the vehicle and restricted to a limited range of movement which is desirable when transporting the pet.

Thus it will be seen that a new and useful device for restraining a pet within a vehicle has been illustrated and described and various changes and modifications may be made therein without departing from the spirit of the invention.

Therefore, I claim:

1. An improvement in a pet restraint for use in a vehicle having passenger seat belts consisting of anchor straps that terminate in a fastening device to hold the passengers within the vehicle, the improvement comprises a harness formed of a flexible belly band extending around the underside of a pet, a flexible chest band secured to said belly band at right angles thereto, a collar band bridging said chest band and extending across said pet, said collar band in spaced angular relation to said belly band, a clasp joining member interconnecting said belly band and said collar band to a seat belt blade on said clasp joining member, means for adjusting said belly band in relation to said pet.

2. The improvement to a pet restraint of claim 1 wherein said seat belt blade and said anchor straps are of a male and femal type used on vehicle seat belts and are correspondingly registrable therewith and each other.

3. The improvement to a pet restraint of claim 1 wherein said clasping member has an attachment point for a lead adjacent said seat belt blade.

* * * * *